United States Patent
Matsuda et al.

(10) Patent No.: US 8,947,865 B2
(45) Date of Patent: Feb. 3, 2015

(54) MOBILE TERMINAL DEVICE

(75) Inventors: Hiroaki Matsuda, Kawasaki (JP);
Tatsuhito Araki, Kawasaki (JP);
Manabu Hongo, Kawasaki (JP);
Hiroaki Sakashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 13/223,829

(22) Filed: Sep. 1, 2011

(65) Prior Publication Data

US 2012/0063074 A1 Mar. 15, 2012

(30) Foreign Application Priority Data

Sep. 14, 2010 (JP) ................................ 2010-205991

(51) Int. Cl.
*G06F 1/16* (2006.01)
*H04M 1/02* (2006.01)
*H05K 5/00* (2006.01)
*H05K 7/00* (2006.01)
*G02F 1/1333* (2006.01)

(52) U.S. Cl.
CPC .................................. *H04M 1/0266* (2013.01)
USPC ............ 361/679.21; 361/679.22; 361/679.26; 361/679.3; 361/679.02; 349/58

(58) Field of Classification Search
USPC ............. 361/679.01, 679.02, 679.03, 679.04, 361/679.05, 679.06, 679.07, 679.21, 361/679.22, 679.26, 679.27, 679.28, 679.3; 455/575.1, 575.2, 575.3, 575.4; 349/58
See application file for complete search history.

(56) References Cited

U.S. PATENT DOCUMENTS

| 7,701,530 | B2 | 4/2010 | Lee |
| 2008/0298003 | A1* | 12/2008 | Pyo ............................... 361/681 |
| 2009/0268120 | A1 | 10/2009 | Ogatsu |
| 2010/0203924 | A1* | 8/2010 | Hirota ........................... 455/566 |
| 2011/0211324 | A1* | 9/2011 | Murakami et al. ............ 361/807 |

FOREIGN PATENT DOCUMENTS

| JP | 2001-183633 A | 7/2001 |
| JP | 2007-094408 A | 4/2007 |
| JP | 2008-245160 | 10/2008 |
| JP | 2009-206752 | 9/2009 |
| JP | 2010-147551 | 7/2010 |
| JP | 2010-175963 A | 8/2010 |
| WO | 2007/023846 A1 | 3/2007 |
| WO | 2009/024842 A1 | 2/2009 |

OTHER PUBLICATIONS

Office Action of Japanese Patent Application No. 2010-205991 dated Jan. 14, 2014 with Partial Translation.
JPOA—Office Action of Japanese Patent Application No. 2010-205991 dated Oct. 7, 2014 with Partial Translation.

* cited by examiner

*Primary Examiner* — Hoa C Nguyen
*Assistant Examiner* — Binh Tran
(74) *Attorney, Agent, or Firm* — Fujitsu Patent Center

(57) ABSTRACT

A mobile terminal device includes a case that forms a storage space for storing a component and that includes an open section at a first surface, a display module that is stored in the open section of the case and that includes a display surface for allowing information to be displayed thereon adjacent to the first surface, a plate that is fixed to an inner surface of the case and that partitions the storage space into a space for storing the display module and a space for storing a component other than the display module, a panel that covers the open section of the case and that supports the display module such that the display module is sandwiched between the panel and the plate, and an adhesive that adheres the panel and a surrounding region of the open section of the case.

4 Claims, 5 Drawing Sheets

MOBILE TERMINAL DEVICE

CROSS-REFERENCE TO RELATED APPLICATIONS

This application is based upon and claims the benefit of priority from the prior Japanese Patent Application No. 2010-205991 filed on Sep. 14, 2010, the entire contents of which are incorporated herein by reference.

FIELD

The embodiment discussed herein relates to a mobile terminal device.

BACKGROUND

Recently, mobile terminal devices, such as cellular telephones, have become increasingly smaller and thinner, and various structures for reduction in size and thickness in a display unit that includes a display module for displaying an image on a screen and an outer panel for covering the display module and in its vicinity have been discussed. Specifically, for example, a simple structure is proposed in which a support frame for supporting a display module and an outer panel is provided with a guide that projects in a direction perpendicular to the plane direction of the outer panel and the outer panel is fixed by that guide.

FIG. 5 illustrates a schematic cross-sectional view of a display unit of a mobile terminal device. As further illustrated in FIG. 5, a structure may be adopted in which a case, that forms a housing, supports a display module. In FIG. 5, a front case 10 and a frame member 20 form a housing of a mobile terminal device. The frame member 20 includes a support portion 20a for supporting components, such as a display module 40 and a substrate 50, at its tip within the housing. A liquid crystal panel 30 covering a display surface of the display module 40 is adhered to the frame member 20.

As illustrated in FIG. 5, components within the housing, such as the display module 40 and substrate 50, are supported by the support portion 20a at the tip of the frame member 20. This eliminates the necessity of a dedicated element to support the components, and thus the mobile terminal device may be thinner. Although not illustrated in FIG. 5, to address the loads of many components imposed on the support portion 20a, a lug extending from a side of the display module 40, which is relatively heavy, may be used to fix the display module 40 by engagement of the lug within the housing. In this case, the loads of the components on the support portion 20a may be lightened, and the frame member 20 may be prevented from being broken.

One example of a device that has a support structure capable of having a reduced overall thickness is described in Japanese Laid-open Patent Publication No. 2007-94408.

While the size and thickness in the overall device of a mobile terminal device have been reduced, a structure that has a maximum size of a display screen may have recently been adopted to offer high visibility of the display screen. That is, a housing that includes a display screen of a mobile terminal device may be required to reduce the area of a frame portion that surrounds the display screen, in other words, to narrow the frame portion.

However, for a structure that uses a lug, there is an issue in that narrowing a frame portion has a limit. That is, because a typical lug is bent when it is engaged during assembly of a device, a space for allowing the lug to be bent is needed in the vicinity thereof. Accordingly, when a display module of a mobile terminal device is engaged within a housing by a lug, a space for allowing the lug to be bent is provided in the vicinity of the lug. As a result, a frame portion that surrounds a display screen includes a section that corresponds to that space in which no components are arranged, and this section inhibits narrowing the frame portion.

A display module may be supported without the use of a lug. In this case, however, the load of the display module and the loads of other components are imposed on one portion, and this portion may be broken. That is, for the example illustrated in FIG. 5 described above, the support portion 20a of the frame member 20 may be broken. For a structure in which the frame member 20 does not have the support portion 20a, the loads of components, including the display module 40, are directly imposed on the liquid crystal panel 30, and the liquid crystal panel 30 may fall out of the frame member 20.

SUMMARY

According to an aspect of the invention, a mobile terminal device includes a case that forms a storage space for storing a component and that includes an open section at a first surface, a display module that is stored in the open section of the case and that includes a display surface for allowing information to be displayed thereon adjacent to the first surface, a plate that is fixed to an inner surface of the case and that partitions the storage space into a space for storing the display module and a space for storing a component other than the display module, a panel that covers the open section of the case and that supports the display module such that the display module is sandwiched between the panel and the plate, and an adhesive that adheres the panel and a surrounding region of the open section of the case.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of a mobile terminal device disclosed in the present application is described in detail with reference to the drawings. However, this embodiment is not intended to limit the present invention.

Figure 1:
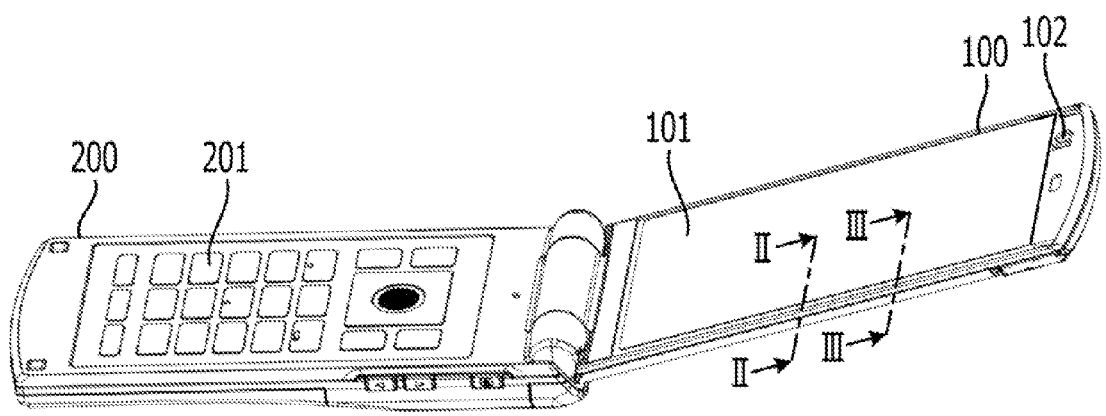
FIG. 1 is a perspective view that illustrates an outer appearance of a mobile terminal device according to an embodiment.

FIG. 1 is a perspective view that illustrates an outer appearance of a mobile terminal device according to an embodiment. The mobile terminal device illustrated in FIG. 1 includes a display housing 100 and an operation housing 200 such that both housings are connected together so as to be openable and closable with respect to each other. FIG. 1 illustrates a state where the display housing 100 and the operation housing 200 are opened with respect to each other.

The display housing 100 includes a liquid crystal panel 101 and a camera 102. The liquid crystal panel 101 is a light-transmitting component that covers a display surface of a display module stored in the display housing 100 and that allows an image displayed on the display surface to pass therethrough. The liquid crystal panel 101 is also referred to simply as a panel. As described below, the liquid crystal panel 101 is adhered to a case that forms the display housing 100 by double-sided tape and supports the display module. The double-sided tape is also referred to as an adhesive. The camera 102 obtains an image of an object. The image obtained by the camera 102 is displayed on the display surface of the display module and is visible through the liquid crystal panel 101.

The operation housing 200 includes an operation key set 201. The operation key set 201 includes numeric keys, for example, and may be pressed by a user when the mobile terminal device is operated. In response to an operation on the operation key set 201, various images are displayed on the display surface of the display module, and the user may view a displayed image through the liquid crystal panel 101.

Figure 2:
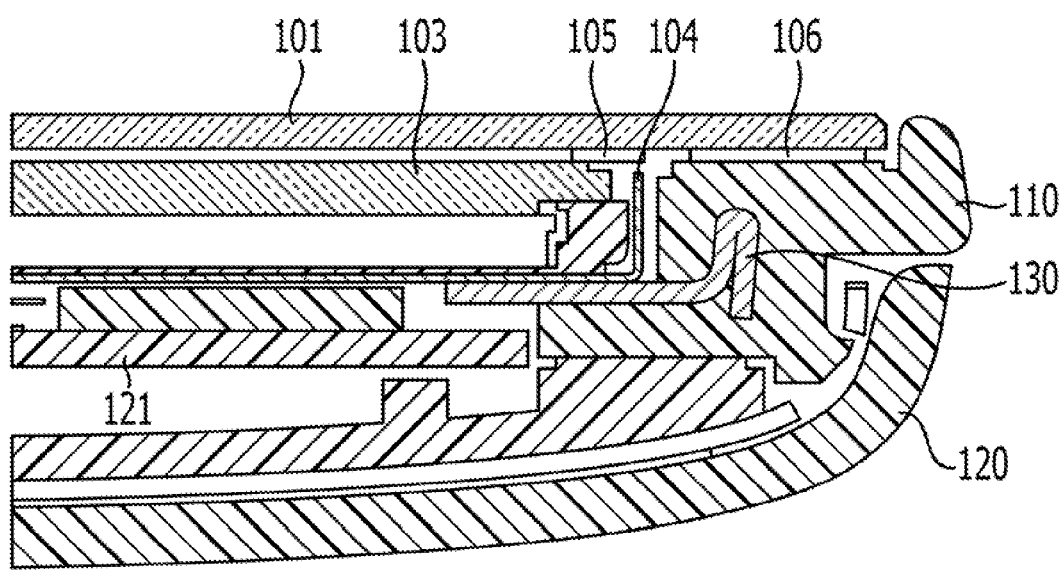
FIG. 2 is a cross-sectional view taken along the line II-II in FIG. 1.

FIG. 2 is a cross-sectional view taken along the line II-II of the presented embodiment in FIG. 1. As illustrated in FIG. 2, the external body of the display housing 100 includes the liquid crystal panel 101, a front case 110, and a rear case 120. A storage space for storing components has an open section and is formed by the front case 110 and the rear case 120. The open section of the storage space is covered with the liquid crystal panel 101. Various components, such as a display module 103 and a substrate 121, are stored in the storage space.

The storage space surrounded by the liquid crystal panel 101, the front case 110, and the rear case 120 is partitioned into two spaces along the thickness direction of the case by a plate 130 fixed to the front case 110. The plate 130 extends from the inner surface of the front case 110 toward the inside of the storage space. The plate 130 partitions the storage space into a space for storing the display module 103 and another space for storing the substrate 121. The space for storing the display module 103 stores the display module 103 and a display-module plate 104 for protecting the display module 103. The space for storing the substrate 121 stores other components, including the substrate 121.

Components illustrated in FIG. 2 are described below. The liquid crystal panel 101 is a plate-like light-transmitting component and includes the outer edge adhered to the front case 110 by double-sided tape 106. The liquid crystal panel 101 covers the open section of the storage space for storing components formed by the front case 110 and the rear case 120. The liquid crystal panel 101 supports the display module 103 and the display-module plate 104 stored in the vicinity of this open section such that both are sandwiched between the liquid crystal panel 101 and the plate 130.

The display module 103 includes the display surface at a side adjacent to the liquid crystal panel 101 and displays various kinds of information on the display surface. Specifically, the display module 103 may display, on the display surface, an image obtained by the camera 102 and an image responsive to a press on the operation key set 201, for example. The display module 103 is stored in a space adjacent to the liquid crystal panel 101, out of the two spaces into which the storage space is partitioned by the plate 130. The display module 103 is arranged in the vicinity of the open section of the storage space formed by the front case 110 and the rear case 120 and is supported between the liquid crystal panel 101 and the plate 130.

The display-module plate 104 covers and protects a side next to the display surface of the display module 103 and a surface opposite to the display surface. The display-module plate 104 shields light by surrounding the display module 103 and improves visibility of the display surface by preventing leakage of ambient light to the display module 103. The display-module plate 104 and the display module 103 are supported between the liquid crystal panel 101 and the plate 130. Because the display module 103 and the display-module plate 104 are supported between the liquid crystal panel 101 and the plate 130, a lug or other elements for fixing the display module 103 is not necessary. Accordingly, a space for allowing the lug to be bent is not needed, and the mobile terminal device according to the present embodiment may have a reduced area of a surrounding region of the display module 103 and achieve narrowing a frame portion.

Packing 105 is disposed between the liquid crystal panel 101 and the display module 103 and seals a surrounding region of the display surface of the display module 103. The packing 105 is also referred to as a sealing member. Accordingly, the mobile terminal device according to the present embodiment may prevent an entry of foreign matter into between the liquid crystal panel 101 and the display surface of the display module 103. The packing 105 separates the liquid crystal panel 101 from the display surface of the display module 103 and may prevent blurring or other defects occurring in a displayed image caused by the liquid crystal panel 101 coming into contact with the display surface.

The double-sided tape 106 has adhesion at both sides. The double-sided tape 106 adheres the liquid crystal panel 101 and the front case 110 together by one side adhering to the liquid crystal panel 101 and the other side adhering to the front case 110. For the present embodiment, the adhesion of the double-sided tape 106 enables the display module 103 and the display-module plate 104 to be supported between the liquid crystal panel 101 and the plate 130. As described below, the loads of components other than the display module 103 and the display-module plate 104 are not imposed on the liquid crystal panel 101, and thus, the adhesion of the double-sided tape 106 may sufficiently prevent the liquid crystal panel 101 from falling off.

The front case 110 and the rear case 120 may be a case member made of synthetic resin, for example, and form the external body of the display housing 100. The front case 110 and the rear case 120 may be mutually engaged by a lug, for example, and form a single storage space therein. The storage space has an open section adjacent to the front case 110, and this open section is covered with the liquid crystal panel 101.

The substrate 121 is a substrate on which various circuits for controlling an operation of the mobile terminal device are mounted. The substrate 121 is stored in a space remote from the liquid crystal panel 101, out of the two spaces in which the storage space is partitioned by the plate 130. Components other than the display module 103 and the display-module plate 104 are also stored in the same space in which the substrate 121 is stored. The load of the substrate 121 and other components are imposed on the rear case 120 or the plate 130. Because the load of the components other than the display module 103 and the display-module plate 104 are not imposed on the liquid crystal panel 101, the load of the components do not cause the liquid crystal panel 101 adhered to the front case 110 by the double-sided tape 106 to fall off.

The plate 130 extends from the inner surface of the front case 110 toward the inside of the storage space and partitions the storage space into two spaces. Specifically, the plate 130 is fixed to the front case 110 by embedding of its outer edge into the front case 110. The plate 130 partitions the storage space into a space for storing the display module 103 and another space for storing the substrate 121. The plate 130 supports the display module 103 and the display-module plate 104 such that both are sandwiched between a first surface of the plate 130 and the liquid crystal panel 101. A second surface of the plate 130 undergoes the load of the components other than the display module 103 and the display-module plate 104. For the mobile terminal device according to the present embodiment, because the plate 130 is fixed by embedding of its outer edge into the front case 110, the load of the components do not cause the plate 130 to fall off or the front case 110 to be broken.

For the present embodiment, the storage space for storing components formed by the front case 110 and the rear case 120 is partitioned by the plate 130 into first and second spaces, the first space stores the display module 103 and the display-module plate 104, and the second space stores components other than the display module 103 and the display-module plate 104, such as the substrate 121. The liquid crystal panel 101 and the plate 130 support the display module 103 and the display-module plate 104 such that both are sandwiched between the liquid crystal panel 101 and the plate 130. A lug or other elements for fixing the display module 103 is not needed, the necessity of a space for allowing the lug to be bent is eliminated, the area of a surrounding region of the display surface may be reduced, and the frame portion may be narrowed. Because the loads of components, including the substrate 121, are not imposed on the liquid crystal panel 101, the mobile terminal device according to the present embodiment may prevent breakage, such as falling off of the liquid crystal panel 101.

For the present embodiment, the display module 103 and the display-module plate 104 are supported between the liquid crystal panel 101 and the plate 130. Thus, it may be difficult to assemble the mobile terminal device. Specifically, in assembly of the mobile terminal device, by the time the liquid crystal panel 101 becomes adhered to the front case 110, the unfixed display module 103 and display-module plate 104 may fall off. For the present embodiment, the display module 103 includes a small projection at a side thereof, and the fit between the small projection and a projection formed on the inner surface of the front case 110 may prevent the display module 103 and the display-module plate 104 from falling off in assembly. This respect is described below with reference to FIG. 3.

Figure 3:
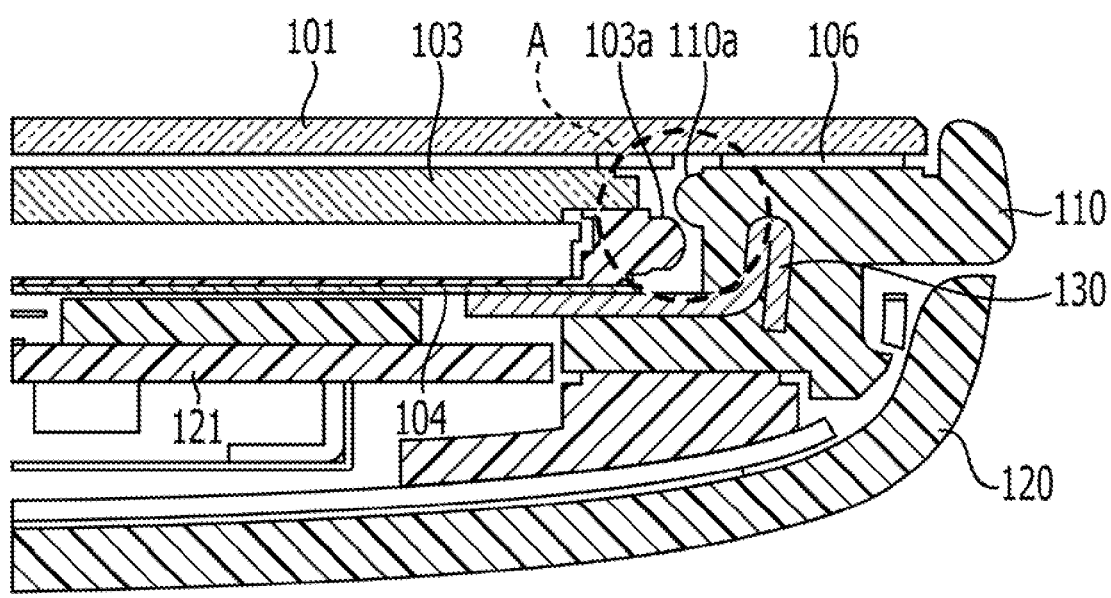
FIG. 3 is a cross-sectional view taken along the line III-III in FIG. 1.

FIG. 3 is a cross-sectional view taken along the line III-III of the presented embodiment in FIG. 1. FIGS. 2 and 3 depict same embodiment but different cross-section positions.

As illustrated in the portion "A" in FIG. 3, the display module 103 includes a small projection 103*a* at a side thereof. The portion where the projection 103*a* is disposed is not covered with the display-module plate 104. The projection 103*a* projects beyond the surface of the neighboring display-module plate 104. The display module 103 may include another small projection similar to the projection 103*a* at another location of the side of the display module 103. For example, the display module 103 may include four projections: two projections at a first side on which the illustrated projection 103*a* is disposed and two projections on a second side opposite to the first side. A structure of the projection 103*a* and its surroundings is described below. This structure is substantially the same as that of each of the other projections and its surroundings.

The front case 110 includes a projection 110*a* having substantially the same size as that of the projection 103*a* at its inner surface that faces the projection 103*a*. As illustrated in FIG. 3, when the display module 103 is supported between the liquid crystal panel 101 and the plate 130, the projection 103*a* projects beyond the tip of the projection 110*a* to an adjacent region of the base of the front case 110. When the display module 103 becomes attached to or detached from the front case 110, the projection 103*a* and the projection 110*a* come into contact and interfere with each other.

Each of the tip of the projection 103*a* and the tip of the projection 110*a* is curved in a direction in which the display module 103 is attached or detached, and the length of an overlap between the small projection 103*a* and the projection 110*a* is very short. The display module 103 may be easily attached or detached by a relatively small force applied to the display module 103. In assembly of the mobile terminal device, the fit between the projection 103*a* and the projection 110*a* may prevent the display module 103 and the display-module plate 104 from falling out of the front case 110.

Figure 4:
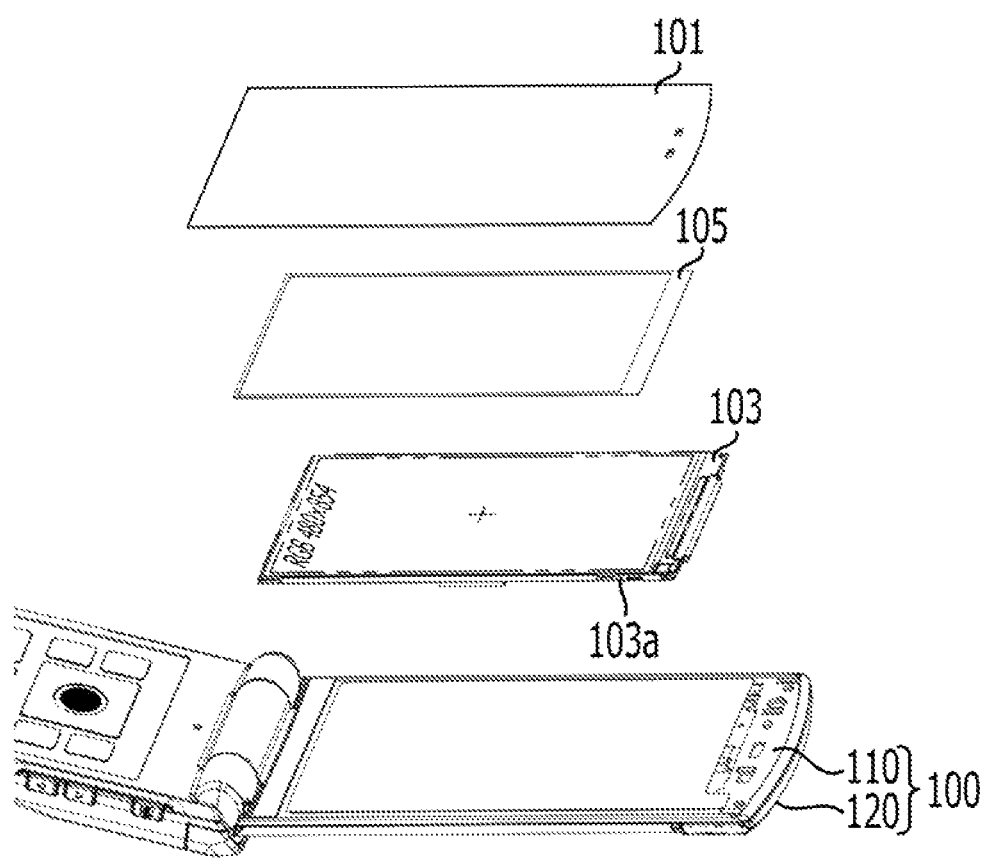
FIG. 4 is an exploded perspective view that illustrates a display unit according to the embodiment.
Figure 5:
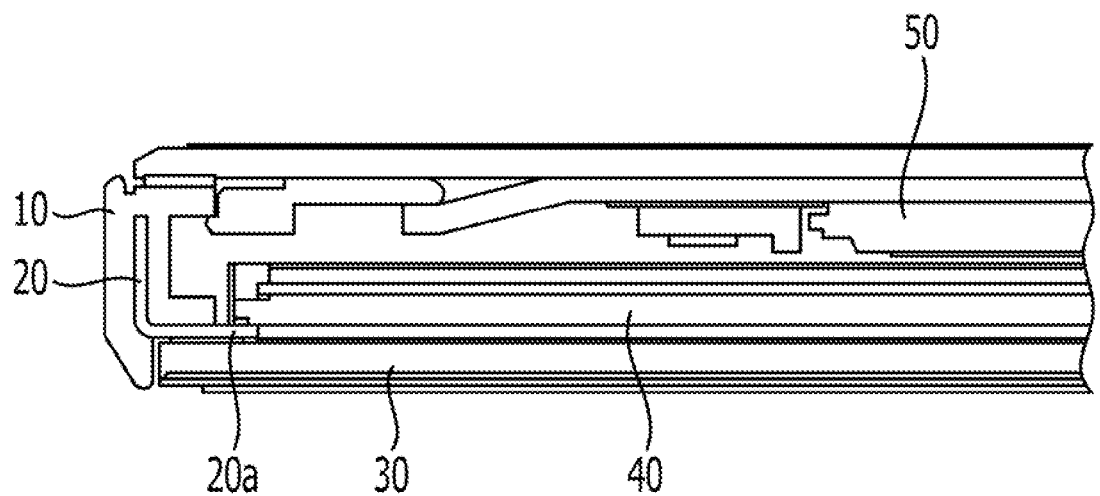
FIG. 5 illustrates a cross-sectional view of a display unit of a mobile terminal device.

After the display module 103 is attached to the front case 110, adhering the liquid crystal panel 101 to the front case 110 by the double-sided tape 106 enables the display module 103 to be supported between the liquid crystal panel 101 and the plate 130. Specifically, as illustrated in FIG. 4, the small projection 103*a* of the display module 103 and the projection 110*a* on the inner surface of the front case 110 are fitted with each other, thus attaching the display module 103 to the front case 110. The packing 105 is inserted between the display module 103 and the liquid crystal panel 101, and the liquid crystal panel 101 is adhered to the front case 110. This causes the display module 103 to be supported between the liquid crystal panel 101 and the plate 130 and be fixed.

The packing 105 has a shape that surrounds the display surface of the display module 103 and is pressed by the adhering of the liquid crystal panel 101 to the front case 110, thus sealing a surrounding region of the display surface. For the present embodiment, the liquid crystal panel 101 does not come into direct contact with the display surface, and blurring occurring in a displayed image caused by contact of the liquid crystal panel 101 may be prevented.

For the present embodiment, a storage space for storing components in a case is partitioned by a plate fixed to the inner surface of the case. A first space obtained by the partitioning stores a display module. The stored display module is supported between a liquid crystal panel and the plate. A second space obtained by the partitioning stores components other than the display module. Accordingly, for the present embodiment, it is not necessary to have a lug for supporting the display module, and the necessity of a space for allowing the lug to be bent may be eliminated. For the present embodiment, it is not necessary to provide a frame portion with a section that corresponds to a space for allowing the lug to be bent, and the whole frame portion may be narrowed. For the present embodiment, the loads of components other than the display module are imposed on the plate or the inner surface of the case and are not imposed on the liquid crystal panel. Accordingly, for the present embodiment, the loads of the components do not cause the display module to fall off, and breakage of the device may be prevented.

For the present embodiment described above, the plate 130 is fixed to the front case 110. Alternatively, however, the plate 130 may be fixed to the rear case 120. The case forming the display housing may be formed integrally as long as the plate is fixed to the inner surface of this case so as to partition the storage space in the case.

A structure disclosed in the above-described embodiment is also applicable to other devices, such as a personal digital assistant (PDA), a notebook computer, and a portable game machine, in addition to a cellular phone. That is, substantially the same structure as that illustrated in the above-described embodiment is applicable to any device as long as it is a mobile terminal device that stores a display module and other components within its housing.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A mobile terminal device comprising:
   a case that forms a storage space for storing a component and that includes an open section at a first surface;
   a display module that is stored in the open section of the case and that includes a display surface for allowing information to be displayed thereon adjacent to the first surface;
   a substrate that is stored in the open section of the case and that includes a mounted circuit;
   a plate that is fixed to the case by embedding an outer edge of the plate into an inner surface of the case and that partitions the storage space into a first space for storing the display module and a second space for storing the substrate;
   a panel that covers the open section of the case and that supports the display module such that the display module is sandwiched between the panel and the plate; and
   an adhesive that adheres the panel and a surrounding region of the open section of the case.

2. The mobile terminal device according to claim 1, further comprising a sealing member that seals a surrounding region of the display surface of the display module and that separates the panel and the display surface of the display module from each other.

3. The mobile terminal device according to claim 1, wherein the first space for storing the display module stores the display module and a display-module plate for protecting the display module.

4. The mobile terminal device according to claim 1, wherein the display module includes a projection at a side next to the display surface,
   the case includes another projection at the inner surface, the another projection having substantially the same size as that of the projection of the display module, and
   the projection of the display module and the another projection of the case are fitted with each other.

* * * * *